United States Patent
Khatri et al.

(10) Patent No.: US 8,151,138 B2
(45) Date of Patent: Apr. 3, 2012

(54) REDUNDANT MEMORY ARCHITECTURE MANAGEMENT METHODS AND SYSTEMS

(75) Inventors: Mukund P. Khatri, Austin, TX (US); Brent Schroeder, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 12/263,045

(22) Filed: Oct. 31, 2008

(65) Prior Publication Data

US 2010/0115330 A1    May 6, 2010

(51) Int. Cl.
*G06F 11/00*    (2006.01)

(52) U.S. Cl. ............... 714/6.23; 714/6.1; 714/42

(58) Field of Classification Search .......... 714/5, 6, 714/42, 6.1, 6.2, 6.23, 6.3, 6.32, 5.1
See application file for complete search history.

(56) References Cited

U.S. PATENT DOCUMENTS

| | | | |
|---|---|---|---|
| 6,671,786 B2* | 12/2003 | Wang et al. | 714/6 |
| 6,820,182 B1* | 11/2004 | Bauman et al. | 714/6 |
| 7,287,138 B2* | 10/2007 | Bland et al. | 714/6 |
| 7,444,540 B2* | 10/2008 | Shaw | 714/5 |
| 2003/0126494 A1 | 7/2003 | Strasser | |
| 2005/0262388 A1* | 11/2005 | Dahlen et al. | 714/5 |
| 2007/0174718 A1* | 7/2007 | Fouquet-Lapar | 714/42 |
| 2008/0133694 A1 | 6/2008 | Holt | |
| 2009/0006793 A1* | 1/2009 | Yamada et al. | 711/162 |
| 2009/0150721 A1* | 6/2009 | Kochar et al. | 714/6 |
| 2009/0172323 A1* | 7/2009 | Swanson et al. | 711/162 |
| 2009/0216985 A1* | 8/2009 | O'Connor et al. | 711/170 |
| 2011/0154103 A1* | 6/2011 | Bulusu et al. | 714/6.23 |

* cited by examiner

*Primary Examiner* — Robert Beausoliel, Jr.
*Assistant Examiner* — Joseph D Manoskey
(74) *Attorney, Agent, or Firm* — Garrana Tran LLP; Andrea E. Tran

(57) ABSTRACT

A method for managing a redundant memory architecture for an information handling system (IHS) may include providing redundant memory for a portion of system memory wherein the redundant memory is configured to mirror data stored in the portion of system memory. The method may further include reporting a parameter associated with the portion of system memory to an operating system of the IHS and executing a program from the portion of system memory.

18 Claims, 3 Drawing Sheets

REDUNDANT MEMORY ARCHITECTURE MANAGEMENT METHODS AND SYSTEMS

BACKGROUND

1. Technical Field

The present disclosure relates generally to the field of information handling systems, and more specifically, to managing redundant memory within information handling systems.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an IHS, an uncorrectable or unrecoverable hardware error may adversely affect the operating system (OS) such as rendering it inoperative or unresponsive. For instance, internal chipset errors and corruption in the system memory may cause machine check exceptions or non-maskable interrupts (NMIs). In an IHS utilizing a Windows OS, NMIs may result in a bug check (e.g., BSOD or blue screen of death). In instances where IHSs employ virtualization, uncorrectable errors may create additional problems. For example, in a server environment implementing virtualization, a physical server may utilize virtualization software, such as a suitable OS, a hypervisor, a virtual machine monitor, a parent partition or any other program capable of virtualization. Virtualization software may enable several virtual machines (VMs), each simulating an IHS, to run on a single physical server or machine. Thus, if an uncorrectable error occurs in the server, it may cause all of the VMs running on the server to crash, thereby greatly reducing the benefits of VMs.

In order to prevent machine check exceptions or NMIs from occurring, some IHSs employ redundant memory techniques to enable recovery from uncorrectable memory errors. Such techniques may include but are not limited to spare memory row, memory mirroring, and memory redundant array of independent DIMMs (memory RAID). However, these forms of memory redundancy may require the mirroring of or redundancy for the entire system memory, thereby possibly significantly reducing the usable system memory. In some cases, current forms of memory redundancy may truncate the amount of usable system memory in half. Furthermore, since memory may prove to be an expensive component with a low failure-rate relative to other components in an IHS, currently employed memory redundancy techniques may not be considered cost-efficient.

Thus, a need exists for systems, methods, and media for providing redundant memory for a portion of system memory.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for managing a redundant memory architecture for an information handling system (IHS) may include providing redundant memory for a portion of system memory wherein the redundant memory is configured to mirror data stored in the portion of system memory. The method may further include reporting a parameter associated with the portion of system memory to an operating system of the IHS and executing a program from the portion of system memory.

Another aspect of the disclosure provides a method for managing a redundant memory architecture for an information handling system including selecting a portion of system memory for providing redundancy by mirroring the portion of system memory. The method further includes executing virtualization software from the portion of system memory, wherein the virtualization software is operable to create a virtual machine.

Another illustrative aspect of the disclosure provides an information handling system (IHS) including a system memory. The system further includes a memory controller configured to manage the system memory, wherein the memory controller is operable to selectively mirror a portion of the system memory. The system also includes an operating system stored within the system memory and in communication with the memory controller, wherein the operating system is operable to be selectively stored within the portion of system memory Yet another aspect of the disclosure provides a computer-readable medium having computer-executable instructions for performing a method for providing a redundant memory architecture for an information handling system (IHS). The method may include providing redundant memory for a portion of system memory wherein the redundant memory is configured to mirror data stored in the portion of system memory. The method may further include reporting a parameter associated with the portion of system memory to an operating system of the IHS and executing a program from the portion of system memory.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a machine" refers to one or several machines, and reference to "a method of managing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
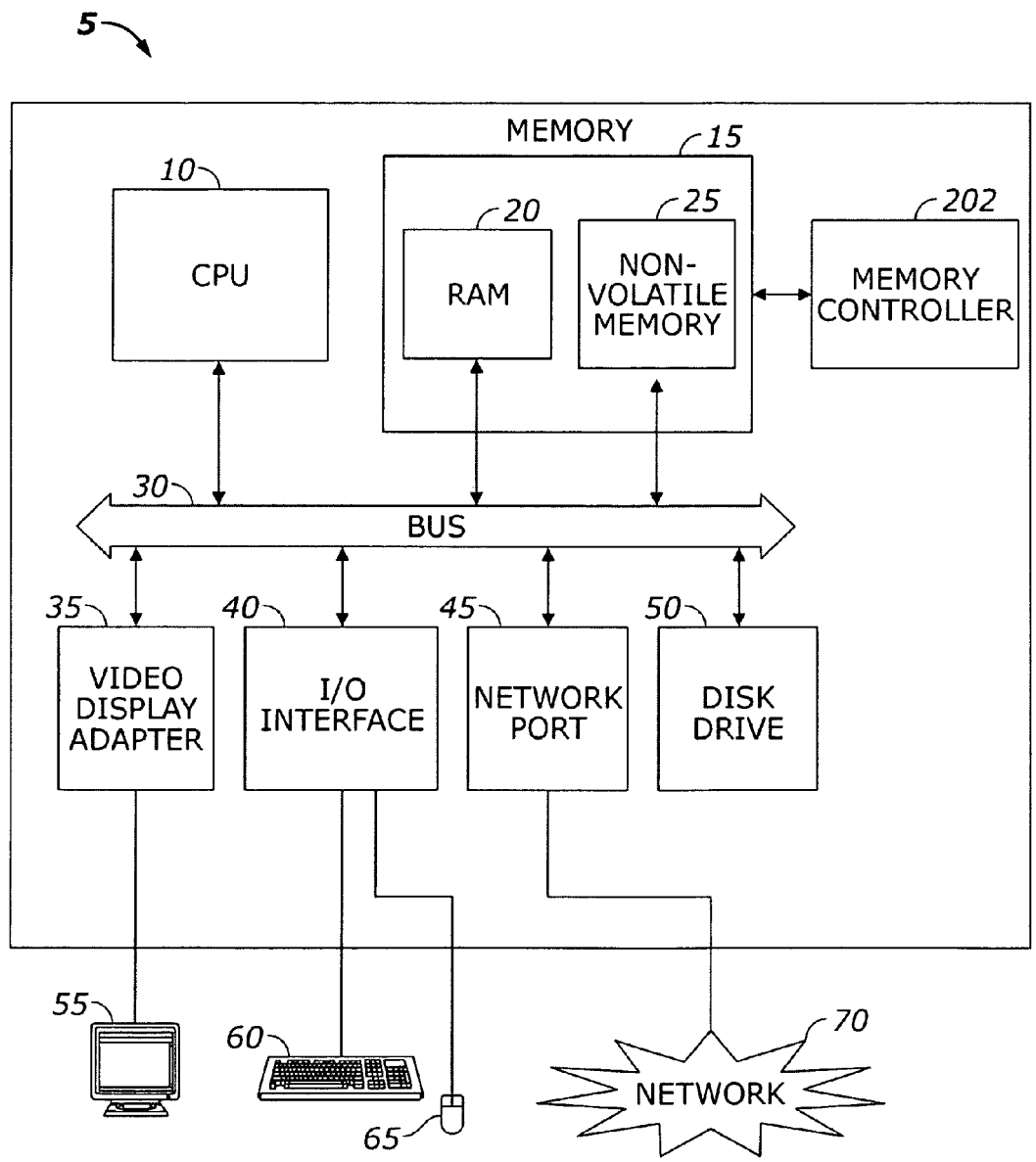
FIG. 1 represents a schematic illustrating an information handling system (IHS) in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The memory controller 75 may manage the flow of data to memory as well as the flow of data out of memory. Additionally, the memory controller 75 may contain logic allowing it to read and write to dynamic random access memory (DRAM) as well as refresh the DRAM. Furthermore, the memory controller 75 may be capable of implementing memory redundancy including but not limited spare memory row, memory mirroring, memory RAID, and/or selective memory mirroring.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

In an IHS, an uncorrectable or unrecoverable hardware error, such as an error in a memory subsystem, a system bus, or an I/O subsystem, may cause the IHS to crash. Moreover, in an IHS implementing virtualization, these errors may present additional difficulties. For example, virtualization software in an IHS may allow multiple software implemented machines, called virtual machines (VMs), to execute or run on a single, physical underlying machine. Under this framework, the virtualization software may manage and allocate the underlying machine's resources between all the VMs, though distinct sets of resources may be simulated for each individual VM. These resources may include, but are not limited to, processors, storage, and memory. Thus, since each VM may believe itself to exist as its own distinct IHS, this degree of separateness may enable different operating systems to be executed on each VM. Moreover, each VM may also implement its own subset of the virtualization software's instruction set architecture (ISA), which may differ from that of the underlying machine. Such flexibility may increase the efficiency and decrease the cost of the overall system. However, if an unrecoverable hardware error, such as a memory failure for example, were to occur and render the virtualization software inoperable or unresponsive, all the VMs running on the IHS would be rendered inoperable or unresponsive as well. Thus, rather than a single machine or process failing, multiple machines (VMs), each with possibly its own functionality and processes, may also fail, possibly creating a machine failure on a massive scale.

Therefore, some designers have implemented memory controllers configured to handle redundant memory techniques, such as spare memory row, memory mirroring, and memory redundant array of independent disks (memory RAID) to allow the IHS to recover from such errors. While these methods may alleviate concerns over the occurrences of unrecoverable errors, they may however, also require redundancy to be applied to the entire system memory. As a result, a system implementing such redundant memory architecture may require significantly more memory compared to that of a normal system to achieve the same amount of usable memory, thereby significantly increasing the cost of the system. Further, providing redundancy for the entire system memory may prove inefficient in instances where a user wishes to mirror only the data he/she deems critical.

Figure 2:
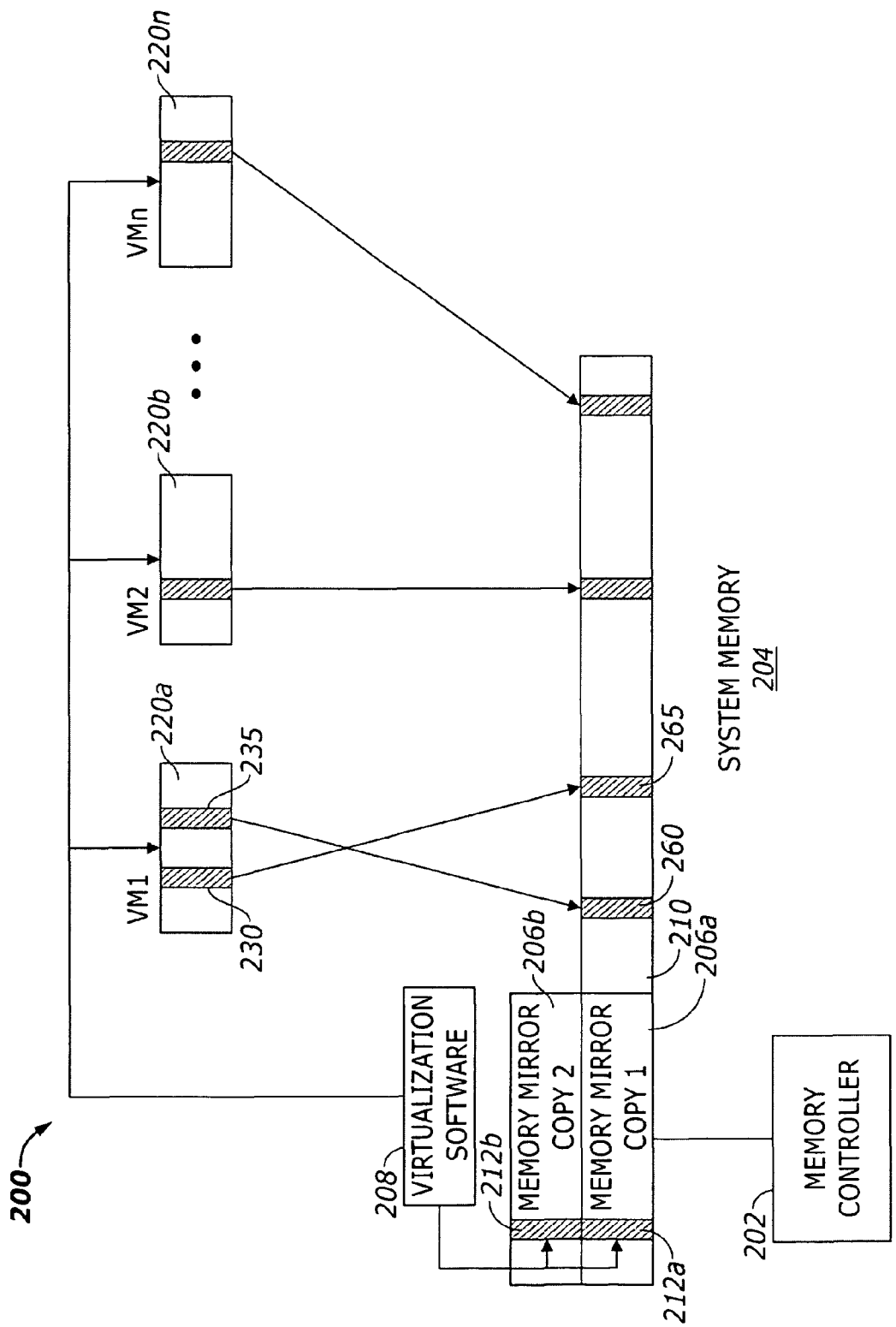
FIG. 2 represents a schematic illustrating a redundant memory architecture in accordance with one aspect of the present disclosure.

Thus, in order to prevent multiple or all VMs in an IHS executing virtualization software from failing due to an uncorrectable error, while still maintaining a high degree of usable system memory, the present disclosure presents a system and method by which only a non-total portion of the previously allocated system memory may be selectively mirrored. To this end, FIG. 2 provides an illustrative implementation of a redundant memory architecture, indicated generally at 200. The redundant memory architecture may be configured for virtualization and selectively mirroring a non-total portion of previously allocated system memory 204. The redundant memory architecture 200 may provide for a memory controller 202 in order to control reading and writing to system memory 204 such as cache memory, main memory, or the like. The memory controller 202 may perform tasks including but not limited to loading data or programs into system memory 204 and/or reading data or executing programs in memory. As used herein, data may refer to any type of information in a form suitable for use with an IHS, and a program may include a set of computer-executable instructions for an IHS to perform particular tasks, carry out particular methods, or implement particular abstract data types. Such data or programs may include virtualization software 208, system files, or any other suitable programs or data. The virtualization software 208 may be any program or software component capable of creating one or more virtual machines (VMs) 220a-n on a single IHS 200. The virtualization software 208 may be referred to by other names including, but not limited to, the virtual machine monitor, the hypervisor, or the parent partition and may enable the VMs 220a-n to run different operating systems independent of one another. In some instances, the virtualization software 208 may also be capable of performing all the functions of a full-scale operating system in addition to its virtualization capabilities. Furthermore, each VM may view itself as a separate machine with its own resources though it may be only a software implementation of a machine and may/may not be aware of any other VMs. Therefore, the virtualization software 208 may communicate with the memory controller 202 to dynamically allocate and disperse system memory 204 as needed to the VMs 220a-n. Consequently, the virtualization software 208 may in effect provide a layer of abstraction between the software-implemented VMs 220a-n and the underlying IHS 200 hardware, e.g. processor(s), memory, storage, etc.

Figure 3:
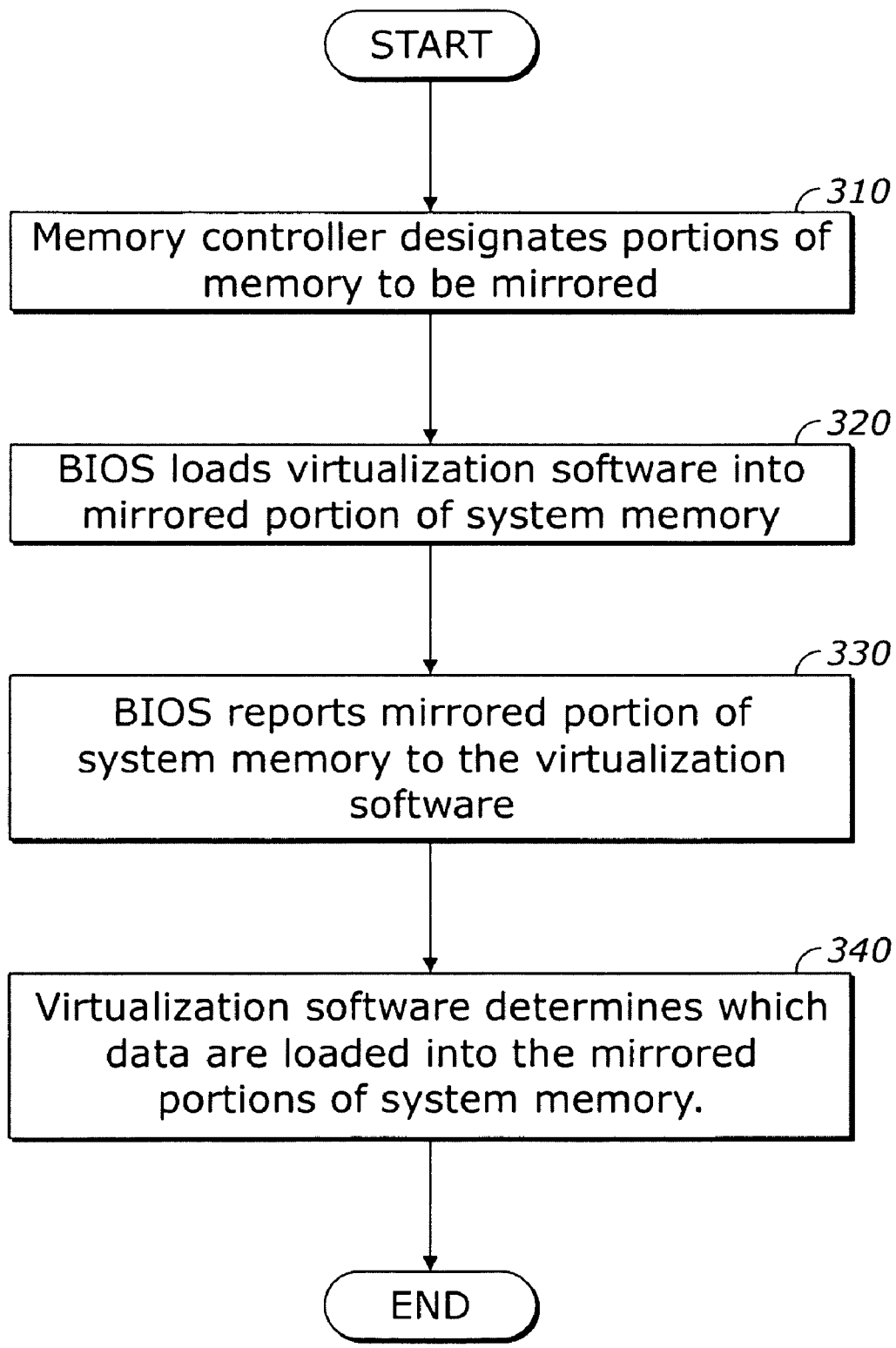
FIG. 3 represents a flow diagram illustrating a process by which redundant memory is provided in accordance with one aspect of the present disclosure.

As depicted in FIG. 2, the memory controller 202 may selectively allocate a non-total portion of previously allocated system memory 204 to be mirrored for redundancy purposes. The memory controller 202 may also communicate the range of the mirrored portions of memory 206a-b to the virtualization software 208 by reporting a parameter containing the exact memory addresses to be mirrored. The non-total portion of system memory to be mirrored and its mirrored copy are represented in FIG. 3 by Memory Mirror Copy 1(MMC1) 206a and Memory Mirror Copy 2(MMC2) 206b respectively. While FIG. 2 depicts MMC1 206a and MMC2 206b to each comprise contiguous blocks of memory, one of ordinary skill in art would understand that non-contiguous memory blocks could also be used to form each mirrored copy. Furthermore, one of ordinary skill in the art would also appreciate that MMC1 206a and MMC2 206b may not have to physically reside adjacent to each other in system memory 204 as illustrated in FIG. 2 and may be spaced in any order.

The virtualization software 208 may be loaded into and may execute in the mirrored portion of memory, which is represented by memory block 212a in MMC1 206a and memory block 212b of MMC2 206b. Thus, because the virtualization software resides in the portion memory for which there exists a mirrored copy, it may be protected against hardware failure, and in particular, memory failure. As a result, a hardware or memory failure may not cause a crash of all the VMs 220a-n supported by the virtualization software 208 as may be the result without the implementation of any memory redundancy. Indeed, because the virtualization software may possess the configuration data and variables concerning the VMs 220a-n, the VMs 220a-n may not need to be loaded into the mirrored portions (MMC1 206a and MMC2 206b) of system memory 204. To this end, as illustrated in FIG. 2, what may be perceived by each VM as its own memory blocks may be mapped to the memory blocks of the non-mirrored system memory 210. For example, memory block 230 of VM1 220a points to physical non-mirrored memory block 265, and memory block 235 points to physical non-mirrored memory block 260. Under this framework, if a VM were to be rendered inoperable due to a memory failure in the non-mirrored system memory 210, for example a corruption of memory block 260, the virtualization software 208 may have the capability to restore or respawn VM1 220a while keeping the rest of the VMs intact. Moreover, the virtualization software 208 may now be aware of the corruption of memory block 260 and may discontinue further allocation of that space in memory. Furthermore, since only a portion rather than the entire system memory 204 may be selectively mirrored, a greater portion of usable, non-mirrored system memory 210 may be available to load and/or execute other data, programs, VMs, or the like. Thus, the protection and advantages of memory redundancy may be fully realized for what a user may deem the most important data or programs, while the memory usage associated with having to mirror the entire system memory may be minimized.

Though FIG. 2 depicts a redundant memory scheme showing the virtualization software 208 to reside in the mirrored memory space 206a-b and the VMs 220a-n in the non-mirrored system memory 210, all other configurations concerning the distribution of mirrored and non-mirrored memory portions of system memory 204 are also envisioned within the present disclosure. For example, a user may desire data or programs other than the virtualization software 208 to also have redundant memory protection. To this end, certain data, programs, or even VMs that a user deems important may also be loaded and/or executed into the mirrored memory portion 206a-b while other data or programs may remain in the non-mirrored system memory 210. In other instances, the virtualization software 208 may make the determination of which VMs, data, or programs are to be executed and/or loaded into mirrored space 206a-b depending, for example, on variables that indicate their importance to a task.

Moreover, while not specifically illustrated in FIG. 2, the present disclosure may also contemplate applying the selective redundant memory technique to systems or IHSs implemented under the Non-Uniform Memory Architecture (NUMA). NUMA presents a memory design for multiprocessors in which each processor can access its own local memory. The NUMA concept may center on the idea that memory local to a processor may provide faster (shorter) access times than memory shared between processors or local to another processor. Thus, a selective redundant memory technique may provide added benefits to an IHS under a NUMA framework. For example, applying the redundant memory architecture previously discussed in FIG. 2 may enable mirroring the local memory of only a selected number of the processors in the IHS rather than having to mirror the local memory of all processors. Furthermore, of the processors selected to employ memory redundancy to their local memory, the method may allow selectively mirroring of only a portion of those memory as well.

Turning now to FIG. 3, a flow diagram is provided illustrating a selective redundant memory process indicated generally at 300. Beginning in step 310, a user may program the memory controller to enable a portion of system memory to be mirrored. For example, BIOS may have an option that a user may select to enable partial memory redundancy. Then, in step 320, BIOS may report to the virtualization software a parameter containing the memory address range of the mirrored portion of system memory. This communication may be performed via the Advanced Control and Power Interface (ACPI) specification or any other suitable interface such as Int15 function E820, and the EFI Memory Map. The ACPI specification may be an open standard available to the public that provides a common interface for software recognition of various hardware components of an IHS. Further, ACPI may enable configuration of motherboards and other IHS devices as well as provide power management of IHS components at the direction of virtualization software or an operation system. Power management may generally refer to the switching of devices to lower power states to conserve energy when the devices are inactive. Moreover, because BIOS has reported the address range of the mirrored portion of system memory to the virtualization software, the virtualization software may be aware that it is executing or running from the said portion. Next, the virtualization software may be loaded into the mirrored portion of system memory so that the virtualization software may be protected against memory failure in step 330. This task may be performed by BIOS or any other operating system loader or device. Additionally, as shown in step 340, the virtualization software may be capable of directing and deciding which other data or programs, if any, should be read into the mirrored portion. The data or programs may include, but are not limited to, system configurations, device information, VM's, and VM configurations. However, one of ordinary skill in the art would recognize that the virtualization software does not have to exclusively make the determination of which data should have redundant memory protection. Other arrangements may exist, such as giving a user direct control of making such a determination. It should also be noted that various other methods are contemplated including all or less than all of the steps described herein and/or mentioned above, any number of repeats or any of the steps shown and/or mentioned above, and performance of the steps in any order.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executed instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure. In particular, the selective redundant memory technique envisioned in the present disclosure may also to apply to non-virtualized environments. Thus, while virtualization software and virtual machines may not exist in such environments, certain elements may still be designated to execute from within a selectively mirrored portion of system memory. For example, an operating system and/or other critical data or programs may be considered important applications and may be selected to run from the redundant portion of system memory.

What is claimed is:

1. A method for achieving a high degree of usable system memory in an information handling system (IHS) executing a virtualization software program that creates multiple software implemented machines and runs other software programs, the method comprising:
    executing an operating system (OS) for the IHS;
    allocating memory locations to system memory of the IHS;
    providing redundant and non redundant memory locations, the redundant memory locations being provided for only a selected portion of the allocated system memory locations and configured to mirror data stored in the selected memory locations;
    reporting a parameter associated with the mirrored portion of the selected memory locations to the OS of the IHS;
    providing a virtualization software program: and
    executing the virtualization program from the mirrored portion of the selected memory locations as identified by the parameter reported to the OS and executing one other software program from the non-redundant memory locations.

2. The method of claim 1, wherein the operating system is executed from the mirrored portion of the allocated system memory locations.

3. The method of claim 1, wherein the virtualization software is operable to selectively determine data storage in the mirrored portion of the selected memory locations as identified by the reported parameter.

4. The method of claim 1 further comprising programming a memory controller of the IHS to enable mirroring of the portion of the allocated system memory locations.

5. The method of claim 1, wherein the parameter reported to the OS is reported via an interface, the interface selected from the group consisting of Advanced Configuration and Power Interface (ACPI) specification, Int15 function E820, and EFI Memory Map.

6. The method of claim 1, wherein providing the redundant memory comprises programming a memory controller of the IHS to enable mirroring of the portion of the allocated system memory locations.

7. A method for achieving a high degree of usable system memory in an information handling system (IHS) executing a virtualization software program that creates multiple software implemented machines capable of running other software programs, the method comprising:
    allocating memory locations to the IHS system memory;
    providing redundant and non-redundant memory locations, the redundant memory locations provided for only a selected portion of the allocated system memory locations, the redundant memory locations configured to mirror data stored in the selected memory locations;
    reporting a parameter associated with the mirrored portion of the selected memory locations to the virtualization software of the IHS;
    executing a virtualization software from the redundant portion of the selected memory locations as identified by the parameter reported to the OS;

creating a first virtual machine through the virtualization software; and creating a second virtual machine through the virtualization software.

8. The method of claim 7, wherein the virtualization program is executed from the mirrored portion of the selected memory locations as identified by the reported parameter and a software program running on the second virtual machine is executed from the non-redundant memory locations.

9. The method of claim 7, further comprising the step of selectively determining data storage in the mirrored portion of the selected memory locations as identified by the parameter reported to the virtualization software of the IHS.

10. The method of claim 7 further comprising programming a memory controller of the IHS to enable mirroring of the portion of the previously allocated system memory.

11. The method of claim 7, wherein the parameter reported to the OS is reported via an interface, the interface selected from the group consisting of Advanced Configuration and Power Interface (ACPI) specification, Int15 function E820, and EFI Memory Map.

12. An information handling system (IHS) executing software programs including a virtualization software program to create multiple software implemented virtual machines to achieve a high degree of usable system memory, the system comprising:

a system memory with a plurality of memory locations, comprising one or more sets of free memory locations and one or more sets of previously allocated memory locations;

a memory controller configured to manage the system memory, wherein the memory controller is operable to selectively mirror a portion of the one or more sets of previously allocated memory locations of system memory to a portion of the one or more sets of free memory locations, the memory controller reporting a parameter associated with the mirrored portion of the selected memory locations;

an operating system in communication with the memory controller;

a virtualization software executed from the mirrored portion of the of the one or more sets of previously allocated memory locations of system memory as identified by the parameter reported to the OS;

a first virtual machine created through the virtualization software;

a second virtual machine created through the virtualization software; and a software program executed from the non-redundant memo locations.

13. The system of claim 12, further comprising a basic input/output system (BIOS) in communication with the memory controller.

14. The system of claim 13, wherein the BIOS reports a parameter associated with the portion of the previously allocated system memory to the operating system via an interface, the interface selected from a group consisting of Advanced Configuration and Power Interface (ACPI) specification, Int15 function E820, and EFI Memory Map.

15. The system of claim 12, wherein the data associated with the first virtual machine is stored in the non-mirrored portion of the selected memory locations.

16. The system of claim 15, wherein the virtualization software is operable to selectively execute the second virtual machine from the non-mirrored portion of the selected memory locations.

17. The system of claim 12, wherein the system memory comprises error-correcting code (ECC) memory.

18. The system of claim 12, wherein the IHS selectively determines data storage in the mirrored portion of the selected memory locations as identified by the parameter associated with the mirrored portion of the selected memory locations.

* * * * *